United States Patent [19]

Suzuki et al.

[11] 4,304,890

[45] Dec. 8, 1981

[54] METHOD FOR PRODUCING PROPYLENE COPOLYMERS USING A CATALYST ACTIVATED PRIOR TO COPOLYMERIZATION

[75] Inventors: Takeshi Suzuki; Hiromasa Chiba, both of Ichiharashi, Japan

[73] Assignee: Chisso Corporation, Osaka, Japan

[21] Appl. No.: 166,832

[22] Filed: Jul. 8, 1980

Related U.S. Application Data

[63] Continuation-in-part of Ser. No. 786,306, Apr. 11, 1977, abandoned.

[30] Foreign Application Priority Data

Apr. 19, 1976 [JP] Japan .................................. 51/44315

[51] Int. Cl.³ .......................... C08F 4/66; C08F 10/00
[52] U.S. Cl. ...................... 526/87; 525/247; 526/119; 526/139; 526/140; 526/141; 526/142; 526/348.2; 526/348.3; 526/348.5; 526/348.6; 526/904
[58] Field of Search .................. 525/247; 526/87, 119, 526/139–142, 904

[56] References Cited

U.S. PATENT DOCUMENTS 3,530,107 9/1970 Yoshioka et al. .................. 526/119
3,669,948 6/1972 Konotsune et al. ................ 526/140
3,959,409 5/1976 Frese et al. ........................ 526/158
4,086,185 4/1978 Shirai et al. ....................... 526/140

FOREIGN PATENT DOCUMENTS 52-12799 4/1977 Japan .
785314 10/1957 United Kingdom ................ 526/159
1384603 2/1975 United Kingdom ................ 526/904

*Primary Examiner*—Edward J. Smith
*Attorney, Agent, or Firm*—Fred Philpitt

[57] ABSTRACT

A method for producing crystalline copolymers of propylene (major component), ethylene and an α-olefin having 4 to 12 carbon atoms, superior in any of various practical physical properties such as cold-resistance, transparency, heat-seal temperature, percentage shrinkage, etc. is provided, wherein a catalyst solution obtained by mixing together a titanium trichloride composition (obtained by mixing and milling a titanium trichloride with a mixed reaction product of $TiCl_4$ with an ether), a dialkylaluminum halide, an electron-donor compound and an inert solvent, is activated in advance of copolymerization, by feeding propylene into the solution under specified feeding conditions, and copolymerization is carried out by feeding propylene and said α-olefin simultaneously and continuously, while feeding ethylene intermittently into the gas phase part of the polymerization zone containing the solution.

4 Claims, No Drawings

METHOD FOR PRODUCING PROPYLENE COPOLYMERS USING A CATALYST ACTIVATED PRIOR TO COPOLYMERIZATION

This application is a continuation-in-part application of Ser. No. 786,306 filed on Apr. 11, 1977, now abandoned.

BACKGROUND OF THE INVENTION

1. Field of the Invention

The present invention relates to a method for activating a catalyst for producing propylene copolymers, in advance of copolymerization by which said propylene copolymers are to be prepared, and also to a method for producing the propylene copolymers using a catalyst thus activated.

More particularly, the present invention relates to a method for producing crystalline copolymers consisting of three or more monomer components including propylene as a main component, and also to a method for activating a polymerization catalyst to be employed for the production of the copolymers, in advance of the copolymerization by which the copolymers are prepared. The copolymers obtained by said production method are suitable for producing, by processing, cold-resistant films such as packaging films for use in winter season or freezed products, films which are sealable at low temperatures, heat-shrinkable films, highly transparent films, sheets of multiple layers for blow molding, etc.

2. Description of the Prior Art

The art for shaping polypropylene into films, sheets, etc. is well known. In such shaping, however, there has been a demand for producing polypropylene which is superior in the practical physical properties necessary for the above-mentioned shaped products such as low temperature impact-resistance, mutual heat-sealability at comparatively low temperatures (which will be hereinafter referred to as low temperature heat-sealability), heat-shrinkability at the time of processing into stretched films (which will be hereinafter referred to as heat-shrinkability), etc. For this purpose, such a method is effective and has been practically employed that a small amount of a copolymerizable component other than propylene (which will be hereinafter often referred to as comonomer) is, in advance, mixed with a large amount of propylene at an appropriate time and in an appropriate amount, followed by copolymerization to give the propylene copolymers, which have the above-mentioned practical physical properties improved over homopolypropylene.

However, such improvement in the processing physical properties of polypropylene according to the above-mentioned copolymerization method has still a problem. For example, in case of an ethylene-propylene (two monomer component system) random copolymer obtained according to a method wherein a small amount of ethylene as a comonomer is, in advance, mixed with propylene and polymerization is carried out, with the increase of the content of ethylene in the resulting copolymer, the transparency and rigidity of the shaped product prepared from the copolymer are notably reduced; the end-opening property of a bag form product prepared from the above-mentioned shaped film (which will be hereinafter merely referred to as end-opening property) becomes inferior; and the amount of a soluble (atactic) polymer (having no utility as plastics) formed at the time of preparation of said random polymer notably increases.

Accordingly, the attempt to improve the above-mentioned various processing physical properties according to said random copolymerization of two monomer component system, has restrictions in respect of the physical properties of the resulting polymer as well as the production yield of the polymer.

Further, a method for producing a copolymer of three monomer component system consisting of ethylene, propylene and an α-olefin is disclosed in Japanese patent application laid-open No. 35487/1974. In case of this method, the resulting polymer is superior in the reduction of the soluble polymer relative to the polymer yield, and the transparency which is one of the processing physical properties of the polymer, etc. However, the amount of the soluble polymer by-produced is still yet large, perhaps due to the fact that the catalyst employed is a usual Ziegler-Natta system catalyst. Further, as for the polymer of three monomer component system obtained according to the above-mentioned production method, the low temperature impact-resistance and the end-opening property which are practical physical properties other than the above-mentioned transparency are insufficient, and further, usual physical properties such as rigidity, Young's modulus, etc. are also insufficient.

The solution of the above-mentioned problem is particularly necessary because of the recent trend of consumer's demand directed gradually to higher class shaped products of polypropylene (particularly the above-mentioned films or sheets) having superior performances and physical properties, and accordingly the standard of evaluation of such shaped products set by the processing makers is now very severe. More concretely, if one of the physical properties of a polypropylene product is superior, but another physical property is inferior to others on an average level, the total evaluation of the product is made based upon said inferior physical property. Accordingly, even though improvement in one or two or more practical physical properties is aimed, other practical or usual physical properties cannot be notably reduced, and on the other hand, in order to carry out the polymerization of propylene smoothly and economically, reduction of the amount of the soluble polymer by-produced, is necessary more than those in the prior art.

In order to solve the above-mentioned technical problem, the present inventors have previously proposed a method for producing a copolymer of three monomer component system consisting of ethylene, propylene and another α-olefin having 4 or more carbon atoms (Japanese patent application No. 3985/1975) (which method will be hereinafter referred to as prior application method).

The present invention is directed to an improved method over the prior art, that is, a method for producing copolymers of three-monomer component or more-monomer component system (referred to hereinafter as multiple component system), employing a catalyst activated in advance of copolymerization.

After strenuous studies made for much more improving the prior application method, the present inventors have found that a copolymer of multiple component system having superior physical properties to those of the prior application method can be obtained by specializing the catalyst for copolymerization, activating the catalyst in advance of copolymerization, specifying the feeding manner of ethylene at the time of copolymerization, and specifying the proportion of the constituents of the resulting copolymer of multiple component system, and at the same time, the proportion of the soluble polymer by-produced can be further reduced, and thus have attained the present invention.

SUMMARY OF THE INVENTION

A first object of the present invention is to provide a method for producing copolymers of a multiple component system containing propylene as a major component and having superior total physical properties to those of known copolymers and copolymers produced thereby. A second object thereof is to provide a method for notably reducing the amount of the soluble polymer formed, at the time of producing the copolymers.

The present invention resides in:

A method for producing a crystalline copolymer consisting of 0.5–3% by weight of ethylene, 85–97% by weight of propylene and 2–11% by weight of another α-olefin having 4–12 carbon atoms, which comprises:
(a) preparing a catalyst solution by mixing together
  (i) a titanium trichloride composition obtained by mixing and milling
    (1) a titanium trichloride obtained by reducing the $TiCl_4$ by metallic aluminum or by further milling the resulting reduction product, together with
    (2) a reaction product of a mixture of titanium tetrachloride with an ether,
  in a mixing ratio of said titanium trichloride (1) to said reaction product (2) of 1:0.001 to 0.3,
  (ii) a dialkylaluminum halide,
  (iii) an electron donor compound, and
  (iv) an inert solvent, in a mixing proportion of 0.5 to 10 mols of said dialkylaluminum halide (ii) and 0.001 to 0.1 mol of said electron donor compound (iii) per gram-atom of titanium in said titanium trichloride composition (i), respectively,
(b) feeding propylene into the resulting catalyst solution at a temperature of 10°–50° C.
  (i) at a feeding rate in a ratio by weight of 0.02–1/said titanium trichloride composition/hr.,
  (ii) in a feeding amount in a ratio by weight of 0.5–5 /said titanium trichloride composition, and
  (iii) under a pressure of atmosphereic pressure to 10 atmospheres,
to obtain an activated catalyst solution containing polypropylene in an amount of 0.5–5 times the weight of the titanium trichloride composition contained in said catalyst solution, in advance of the subsequent copolymerization (hereinafter abbreviated merely to polymerization), (this step (b) being hereinafter referred to as preactivation of catalyst), and
(c) feeding into a polymerization zone containing said activated catalyst solution,
  (1) 100 parts by weight of propylene,
  (2) 2 to 13 parts by weight of an α-olefin having 4 to 12 carbon atoms, and
  (3) 1 to 5 parts by weight of ethylene,
  said propylene and said α-olefin having 4–12 carbon atoms being fed into the catalyst solution at the same time and continuously,
  said ethylene being fed into the gas phase part of the polymerization zone intermittently at time intervals of 5 to 60 minutes, the once feeding time being 1 to 5 minutes, the feed rate of ethylene being 0.6 to 2.4 g per minute and per g of titanium trichloride composition, and the polymerization condition being under a temperature of 50° to 75° C. and a pressure of 5 to 40 kg/cm².

DETAILED DESCRIPTION OF THE INVENTION

As a prior art, a method for producing crystalline propylene-ethylene-butene-1 terpolymer under a low pressure is disclosed in U.S. Pat. No. 3,959,409.

However, the catalyst employed in the method is directed to a mixed catalyst consisting of a conventional Ziegler-Natta catalyst i.e. titanium aluminum chloride prepared by reducing $TiCl_4$ with metallic aluminum or organoaluminum compounds, and a chlorine-containing organometallic compound. In the method, no electron donor is added and also no catalyst activation prior to polymerization is carried out. Further, the resulting polymer is insufficient in the points of soluble polymer formation, Young's modulus, end-opening property, low temperature heat-sealability, low temperature impact-resistance, etc. Furthermore, even if an electron donor is added to the catalyst of the prior art method and the resulting material is subjected to preliminary activation prior to polymerization, no effectiveness as in the present invention is exhibited. Still further, even if the catalyst of the present invention is substituted for that in the prior art method, no effectiveness as in the present invention is exhibited. Results of concrete comparison tests therefor will be mentioned later in Comparative examples 29–33, 12 and 13.

The present invention will be hereinafter mentioned below in detail.

(a) Method for preparing the catalyst solution

The above-mentioned titanium trichloride to be employed in the preparation of the titanium trichloride composition, refers to those obtained by reducing $TiCl_4$ by metallic aluminum and then removing $TiCl_4$ in excess, which are usually shown by a formula of $TiCl_3 \cdot 1/3 AlCl_3$, i.e. so-called A type, or a milled product thereof, so-called AA type. The above-mentioned reaction product of a mixture of $TiCl_4$ with an ether refers to those obtained by reacting $TiCl_4$ (1 part) with an ether (1 to 20 parts), e.g. at room temperature and under the atmospheric pressure. The ether employed refers to an organic compound (mainly hydrocarbon) having one ether linkage or more in the molecule. As such, e.g. diethyl ether, n-butyl ether, n-propyl ether, isobutyl ether, methyl butyl ether, amyl ether, tetrahydrofurane, dioxane, diethylene glycol dimethyl ether, etc. are mentioned. As for the mixing and milling of the titanium trichloride composition together with the above-mentioned reaction product, it is disclosed in e.g. Japanese patent publication No. 9751/1975. Namely, as for the milling means, conventional apparatuses e.g. ball mill, vibration mill, aerofall mill, column type mill, ring mill, impact mill, etc. are mentioned. The milling time is several hours or longer. The milling temperature is room temperature to 200° C. The ratio of the amounts employed, of the titanium trichloride composition to the reaction product of the mixture of $TiCl_4$ with an ether is 1:0.001–0.3.

As for the dialkylaluminum halide (ii) to be mixed with the titanium trichloride composition (i), those having a general formula $AlR_2X$ wherein X is a halogen atom are employed. For example, as for R, ethyl, isobutyl, etc. and as for X, chlorine, iodine, etc. are mentioned. Concrete examples include diethylaluminum chloride, di-n-propylaluminum chloride, di-i-butylaluminum chloride, diethylaluminum bromide, diethylaluminum iodide, diethylaluminum fluoride, etc. Mixtures thereof may be employed. Those having a general formula $AlR_1R_2X$ may be also employed.

As for said electron-donor compound (iii) to be mixed together, oxygen-containing organic compounds such as aliphatic monoethers having 2–20 carbon atoms, aliphatic glycol ethers having 2–20 carbon atoms, e.g. diethylene glycol dimethyl ether, tetraethylene glycol dimethyl ether, tetraethylene glycol diethyl ether, aliphatic or aromatic caroxylic acid esters, e.g. ethyl acetate, butyl acetate, methyl benzoate, methyl methacrylate;

nitrogen-containing organic compounds such as aliphatic or alkylaryl, primary, secondary or tertiary amines having 2–20 carbon atoms (but, in the case of tertiary amines, 3 carbon atoms or more), e.g. n-butyl amine, pyridine;

sulfur-containing organic compounds such as aliphatic or alkylaryl thioethers having 2–20 carbon atoms and carbon disulfide; and phosphorus-containing organic compounds such as trialkyl or triaryl phosphines having 3–21 carbon atoms and trialkyl phosphites having 3–21 carbon atoms, e.g. trimethyl phosphite, are mentioned.

Particularly, diethylene glycol dimethyl ether, tetraethylene glycol dimethyl ether, tetraethylene glycol diethyl ether, etc. among the oxygen-containing organic compounds are preferable in the point of effectiveness.

As for the above-mentioned inert solvent to be employed, liquid hydrocarbons such as aliphatic compounds, e.g. n-hexane, n-heptane, and aromatic compounds, e.g. benzene, toluene, are mentioned.

The mixing proportion of these compounds of the above-mentioned components (i), (ii) and (iii) is 0.5 to 10 mols of (ii) and 0.001 to 0.1 mol of (iii) per 1 gram-atom of titanium in (i), respectively. Although the inert solvent (iv) may be employed in conventional amount, it is preferred that the solvent be employed in a larger amount than the total of the amounts of the catalyst components of (i) to (iii).

The mixing order of these four components may be optional.

(b) Method for preactivation of catalyst (treatment of catalyst solution with propylene):

A given amount of propylene is absorbed into the catalyst solution obtained in the step (a), at a temperature of the solution of 10°–50° C., a feed rate (in a ratio by weight) of 0.02–1/titanium trichloride composition of (a)/hr., and under a pressure of the atmospheric pressure to 10 atms.

The effectiveness of the treatment of the catalyst solution with propylene on the polymerization of the present invention is as follows: the formation rate of the soluble polymer is small, Young's modulus of the copolymer formed increases, and the end-opening property is improved.

If the solution temperature is lower than 10° C., the absorption rate is small, while if it exceeds 50° C., the effectiveness of the propylene treatment becomes small. Thus temperatures outside the above-mentioned range are undesirable. This applies also to the cases where the feed rate and the pressure of propylene are outside the above-mentioned respective ranges. Further, as for the amount of propylene fed, a ratio by weight of 0.5–5.0/titanium trichloride composition of (a) is preferable. Outside this range, a desirable result (a small amount of the soluble polymer formed and copolymers of multiple component system having superior physical properties) cannot be obtained in the polymerization after activation of the catalyst.

In this treatment with propylene, for controlling the polymerization rate or the molecular weight of the resulting very small amount of polypropylene, it is not preferable to employ hydrogen.

If at least one of a treating temperature lower than 10° C. and a propylene-feeding rate exceeding 1.0 times by weight/titanium trichloride composition of (a)/hr is employed, a polypropylene having a remarkably high molecular weight is formed, and when such a polypropylene is mixed in the product of the copolymer of multiple component system obtained after the polymerization carried out after the activation of catalyst, the meltability of the resulting product is inferior and becomes a cause of fish eye, and the transparency of the resulting product is also inferior.

For the above-mentioned reason, it is necessary to carry out the activation of catalyst in advance of polymerization, of the present invention, substantially in the absence of hydrogen. These terms "substantially in the absence of hydrogen" refer to an amount of hydrogen of 1% by volume or less, preferably 0.1% or less, more preferably 0%. The substantial presence of hydrogen is undesirable since the effectiveness of inhibiting the amount of the soluble polymer formed which is one of the effectivenesses of the present invention is not exhibited thereby. The catalyst solution immediately after the activation may be employed for producing the copolymer of multiple component system of the present invention. Alternatively it may be stored in the atmosphere of an inert gas at a temperature of 50° C. or lower, preferably room temperature or lower, over several days to several weeks without any remarkable reduction in the polymerization activity.

(c) Method for copolymerizing ethylene, propylene and an $\alpha$-olefin having 4–12 carbon atoms:

Polymerization of the present invention by the use of the catalyst activated in advance of the polymerization, of the above-mentioned item (b) and the resulting copolymer of multiple component system having a composition in a ratio by weight, of 80–98%, preferably 85–97% of propylene, 0.5–5.0%, preferably 0.5–3% of ethylene and 1–15%, preferably 2–11% of an $\alpha$-olefin having 4–12 carbon atoms, will be explained below.

According to the polymerization method of the present invention, ethylene, propylene and another $\alpha$-olefin having 4–12 carbon atoms are fed into a polymerization zone containing the activated catalyst solution of the present invention, in a manner mentioned below, solely one after another or intermittently or continuously in admixture. The activated catalyst solution is usually diluted with an inert solvent for polymerization. As for inert solvent, aliphatic saturated hydrocarbons such as propane, butane, pentane, hexane, heptane, etc. may be employed for easy use. Further, propylene itself which is an important polymerizable component for so-called non-solvent polymerization method or gas phase polymerization method, may be also employed as a solvent for diluting the activated catalyst solution of the present invention.

As for the polymerization temperature of the present invention, a range of 50°–75° C. is preferred. If the temperature is lower than 50° C., the polymerization rate is smaller and the effectiveness of removing the reaction heat in the polymerization vessel is inferior and hence such lower temperatures are uneconomical, while if it exceeds 75° C., the proportion of the amount of the soluble polymer formed increases and hence such higher temperatures are also undesirable.

As for the polymerization pressure, there is no particular limitation thereto, but the range of 5-40 kg/cm$^2$ which is employed in the usual low pressure method olefin polymerization is preferable in practical use.

Further as for the polymerization method, it goes without saying that polymerization can be carried out batchwise or continuously.

The polymerization method of the present invention can be carried out in the presence of hydrogen. By increasing the amount of hydrogen present, the molecular weight of the copolymer of multiple component system of the present invention can be reduced. The presence of a small amount of hydrogen also has an effectiveness of increasing the polymerization rate.

The proportion of the components of the copolymer of multiple component system of the present invention can be maintained at a given composition, by maintaining the ratio of the monomer components fed to the polymerization, of propylene as a major amount component, another α-olefin having 4-12 carbon atoms as a minor component and ethylene as a minor amount component, and the feeding manner within fixed ranges during the polymerization time.

Propylene as a major or a larger amount component may be maintained under a fixed pressure or higher or fed at a fixed rate during the polymerization time. Further the α-olefin having 4-12 carbon atoms, as a minor amount component, is preferably continuously fed. However, it is also possible to feed the olefin intermittently at a time interval to such an extent that no obstacle is brought about, e.g. a time interval of 10 minutes. The ratio of the amount thereof employed, to that of propylene, may be almost similar to the range of the ratio by weight thereof to propylene in the aimed copolymer of multiple component system, i.e. (1-15):(80-98), since the portion which is lost as a soluble polymer is very small in the absolute amount, due to employment of the catalyst of the present invention.

The above-mentioned range is abbreviated to 0.0102-0.188 as calculated as follows:

(lower limit) 1/98=0.0102
(upper limit) 15/80=0.188

Accordingly a range of 0.01-0.18 is preferable.

As for the range of the ratios of the content of an α-olefin to that of propylene in the copolymer, if the above-mentioned respective preferable ranges of the contents, i.e. 2 to 11 and 85 to 97 (% by weight), described above in the summary of the invention, are employed, then the above range of the ratios becomes 0.0206 to 0.1294 as calculated as mentioned above; hence it is more preferable that the ratio of the amount of the α-olefin fed, to that of propylene fed be 0.02 to 0.13.

Next, as for the feeding manner of ethylene as a minor amount component and the rate of ethylene employed, continuous feed is undesirable unlike the case of the α-olefin of C$_4$-C$_{12}$, and ethylene is portionwise and intermittently fed at a time interval of 5-60 minutes. As for the feeding rate of ethylene, 0.6 to 2.4 g per minute and per g of titanium trichloride composition is preferable.

In case of continuous feed of ethylene, there occurs such a tendency that a considerable amount of ethylene is converted to a soluble polymer even in case where ethylene is uniformly mixed with propylene, since the polymerization rate of ethylene is much larger than that of propylene and also ethylene is liable to form a soluble copolymer.

In case of intermittent feed of ethylene, since propylene is present in a large amount, there is no fear in the method of the present invention, that ethylene homopolymer or a block copolymer of ethylene-propylene-α-olefin of C$_4$-C$_{12}$ is formed.

However, even in the case of the intermittent feed, if the time interval is shorter than 5 minutes, the effectiveness of improving the physical properties, particularly the low temperature impact-resistance, aimed in the copolymer of multiple component system of the present invention cannot be observed or is very insufficient, while if the time interval exceeds 60 minutes, the amount of one divided portion of ethylene fed is increased and also the transparency of the resulting copolymer becomes inferior, and further the amount of soluble polymer formed is rapidly increased. Further, if the feeding rate of ethylene is lower than the above-mentioned preferable range (0.6 to 2.4 g/min./g of TiCl$_3$ composition), the effectiveness of the intermittent feed is insufficient, while if it exceeds the range, the percentage of soluble polymer formed increases, and also the resulting polymer is inferior in the points of transparency and fish eyes. Thus in this respect, the object of the present invention cannot be achieved.

Further, even when ethylene is fed at a time interval within a range of 5-60 minutes of the method of the present invention, it is necessary to feed ethylene to the gas phase part of the polymerization vessel. If it is fed to the liquid phase part thereof, the middle and low temperature impact resistance among the practical physical properties of the copolymer of multiple component system of the present invention becomes not inferior, but the transparency becomes notably inferior. The ratio of the amount of ethylene employed, to that of propylene may fall within a range narrower to a certain extent than the range of the ratio by weight thereof to propylene in the aimed copolymer of multiple component system, i.e. (0.5-5.0):(80-98), since the part which is lost as a soluble polymer is smaller in the absolute amount, due to employment of the catalyst of the present invention, than those in case of copolymers of three or more monomer component system prepared by using conventional catalysts.

The above-mentioned range is abbreviated to 0.00510-0.0625 as calculated as follows:

(lower limit) 0.5/98=0.00510
(upper limit) 5/80=0.0625

Considering the fact that as the soluble polymer, a copolymer having an ethylene content ratio about several times higher than the ratio of the amounts of ethylene to propylene fed is formed, a range of 0.01-0.10 is preferable.

As for the range of the ratios of the content of ethylene to that of propylene, if the above-mentioned respective preferable ranges of the contents, i.e. 0.5 to 3 and 85 to 97 (% by weight), described above in the summary of the invention, are employed, then the above range of the ratios becomes 0.00515 to 0.0353 as calculated as mentioned above; hence it is more preferable that the ratios of the amount of ethylene fed, to that of propylene fed be 0.01 to 0.05.

Accordingly, when polymerization is carried out in the above-mentioned feeding manner, employing a monomer composition in the ranges of 1-10 parts by weight, preferably 1 to 5 parts of ethylene and 1 to 18 parts by weight, preferably 2 to 13 parts of an α-olefin having 4–12 carbon atoms based upon 100 parts of propylene, it is possible to obtain a copolymer of multiple component system of the present invention having a composition of 80–98%, preferably 85 to 97% by weight of propylene, 0.5 to 5%, preferably 0.5 to 3% by weight of ethylene and 1 to 15%, preferably 2 to 11% by weight of an α-olefin having 4–12 carbon atoms. As for such an α-olefin having 4–12 carbon atoms, for example, butene-1, pentene-1, hexene-1, heptene-1, octene-1, nonene-1, dodecene-1, etc. are mentioned, but it is not limited to these, and also it may be possible to employ two or more kinds of these α-olefins in admixture.

With regard to the copolymer of multiple component system having a composition in the above-mentioned ranges, if the ethylene content is lower than 0.5% by weight, the effectiveness of improving the physical properties of the copolymer is smaller, while if it exceeds 5% by weight, the amount of the soluble polymer by-produced increases and also the transparency, rigidity, end-opening property, etc. which are the properties aimed for the copolymer are reduced. Thus the values outside the above-mentioned range are undesirable.

Further if the content of the α-olefin having 4–12 carbon atoms is lower than 1% by weight, the above-mentioned effectiveness of improving the physical properties of the copolymer is smaller, while if it exceeds 15% by weight, not only the aimed physical properties are not particularly improved, but also there occurs such a tendency that the low temperature impact strength is reduced. Thus the values outside the above-mentioned range are also undesirable.

The copolymer of multiple component system of the present invention produced as mentioned above, is, as shown in Examples mentioned below, not only superior in the practical physical properties of transparency, heat-sealable temperature, percentage shrinkage, end-opening property, etc., but also suitable in the values of physical properties of Young's modulus, melting point, etc. Further the copolymer has such a specific feature that the amount of the soluble polymer by-produced is smaller than those of practically corresponding crystalline ethylene-propylene copolymer of two monomer component system.

The present invention will be further illustrated by way of the following non-limitative Examples and Comparative examples.

The terms employed in the following Tables and the methods for measuring them will be mentioned below.

$$CY = \frac{\text{Powder formed (g)}}{\text{Titanium trichloride composition employed (g)}}$$

Percentage of soluble polymer formed $$= \frac{\text{Soluble polymer (g)}}{\text{Powder formed (g) + Soluble polymer (g)}} \times 100\%$$

MFR (melt flow rate): measured according to ASTM D-1238 (L)
Melting point: measured by means of DSC (°C.)
Haze: measured according to ASTM D-1003-52 (%)
Heat seal temperature: contact-bonded at a given temperature, under a load of 1 kg/cm$^2$ for one second by means of a heat-sealer and subjected to T type peeling at a peeling angle of 180° and at a rate of 200 mm/min.

The temperature at 0.50 kg/15 mm is made heat seal temperature.
Percentage shrinkage: percentage obtained when the sample has been heated in a glycerine bath at 150° C. for 30 seconds (%)
Punching impact strength: measured according to ASTM-D-781 (kg-cm).
End-opening property: load under which an area of 1 cm$^2$ is peeled off by means of a slip tester is measured.
Fish eye: Number of lens-like pits per 1,000 cm$^2$ of film, having diameters of 0.2 mm or larger.

EXAMPLE 1

(a) Preparation of catalyst solution:
(1) Reaction of a titanium trichloride with a reaction product of TiCl$_4$ with an organic ether:

100 Gram of a titanium trichloride (AA) was introduced in a 1 l capacity stainless steel ball mill (cylindrical, rotation type (120 RPM) and containing 80 steel balls having a diameter of 10 mm), and a reaction product obtained by mixing and reacting 5.0 g of diethyl ether with 1.0 g of TiCl$_4$ at room temperature in advance, was added thereto. Milling treatment was carried out at room temperature for 15 hours.

(2) Mixing together of components:
0.5 L of n-hexane was fed into a 1.0 l capacity reactor, and thereto were added 6.0 g of diethylaluminum chloride, 5.0 g of a titanium trichloride composition obtained by the above-mentioned treatment and 0.05 ml of diethylene glycol dimethyl ether.

(b) Preactivation of catalyst:
While the resulting mixture is maintained at an inner temperature of 30° C. with stirring, propylene was fed and absorbed at a rate of 3.0 g/Hr for 2 hours, that is, the amount of propylene fed was 1.2 g/g.titanium trichloride composition, and the feeding rate thereof was 0.6 g/Hr, g.titanium trichloride composition.

(c) Polymerization reaction:
25 L of n-hexane was introduced into a 50 l capacity polymerization vessel, and after the total amount of the above-mentioned catalyst was added thereto, 25 Nl of hydrogen gas was added. A mixed gas of propylene with butene-1 in a ratio by weight of propylene to butene-1 of 9/1 was continuously fed into the polymerization vessel at an inner temperature of 60° C. so as to maintain the pressure inside the polymerization vessel at 10 kg/cm$^2$.

On the other hand, ethylene was intermittently fed into the gas phase part of the polymerization vessel, at a time interval of 30 minutes, 6 times and for a feeding time of 5 minutes and in an amount of 16.0 g every time, that is, the amount of ethylene fed (the total amount of ethylene every time) was 96 g, and the feeding rate was 0.64 g/min., g.titanium trichloride composition. 5 L of methanol was added to the contents of the polymerization vessel 180 minutes after the start of the polymerization, and remaining monomers were discharged. The temperature was then elevated up to 75° C. and stirring was carried out for 30 minutes, followed by adding 10 l of purified water and further stirring for 30 minutes. The resulting material was allowed to stand and the lower layer of MeOH-water was discharged. To the upper layer part was added 10 l of an aqueous solution having 5 g of sodium hydroxide dissolved therein. After stirring for 30 minutes, the water layer was discharged.

Again, washing and discharge of water layer were repeated with 10 l of purified water. Finally a powdery polymer was recovered by means of a centrifugal separator and dried to give 5.1 kg of a powdery copolymer. Further, a part of the n-hexane liquid obtained by the centrifugal separation was taken to measure the amount of the soluble polymer contained therein. It was found that 0.11 kg as a whole was formed.

The polymerization conditions, the results and the measurement results of physical properties are summarily shown in Tables 1. (This Example 1 corresponds to Example 1 in the parent application Ser. No. 786,603.)

Subsequent Examples and Comparative examples are divided into 8 groups and the respective groups will be successively described below.

GROUP (1)

In this Group, effects of preactivation conditions of catalyst are shown.

COMPARATIVE EXAMPLE 1

Example 1 was repeated except that no preactivation of catalyst was carried out. (This Comparative example corresponds to Comparative example 3 of the parent application Ser. No. 786,306.)

EXAMPLES 2 AND 3 AND COMPARATIVE EXAMPLES 2 AND 3

Example 1 was repeated except that preactivation of catalyst was carried out at varied temperatures shown in Table 1.

COMPARATIVE EXAMPLES 4 AND 5

Example 1 was repeated except that hydrogen was employed in an amount of 1.0 l (Comparative example 4) or 0.01 l (Comparative example 5), in the preactivation of catalyst.

EXAMPLES 4 AND 5 AND COMPARATIVE EXAMPLES 6 AND 7

Example 1 was repeated except that propylene feed was carried out at varied feeding rates shown in Table 1 (while the amount was kept constant), in the preactivation of catalyst.

EXAMPLES 6–8 AND COMPARATIVE EXAMPLES 8 AND 9

Example 1 was repeated except that the time and amount of propylene feed were varied as shown in Table 1 (while the feeding rate was kept constant).

The results of the above Examples and Comparative examples are shown in Table 1.

TABLE 1

| Example or Comparative example | Conditions of preactivation | | | | | Conditions of polymerization | | | |
|---|---|---|---|---|---|---|---|---|---|
| | Temperature (°C.) | Time (Hr) | $H_2$ (l) | Amount of $C_3^=$ fed (g/g · Ti-* comp.) | Feed rate of $C_3^=$ (g/Hr,g. *Ti-comp.) | Ratio of α-olefin /$C_3^=$ (wt) | Amount of $C_2^=$ fed (g) | $C_2$ feed, interval (min.)/ feed time** (min.) | Feed rate of $C_2^=$ (g/min., *Ti-comp.) |
| Ex. 1 | 30 | 2 | 0 | 1.2 | 0.6 | 1/9 | 96 | 30/5 | 0.64 |
| Com. ex. 1 | — | — | — | — | — | " | " | " | " |
| Ex. 2 | 50 | 2 | 0 | 1.2 | 0.6 | " | " | " | " |
| Ex. 3 | 10 | " | " | " | " | " | " | " | " |
| Com. ex. 2 | 55 | " | " | " | " | " | " | " | " |
| Com. ex. 3 | 5 | " | " | " | " | " | " | " | " |
| Com. ex. 4 | 30 | " | 1.0 | " | " | " | " | " | " |
| Com. ex. 5 | " | " | 0.01 | " | " | " | " | " | " |
| Com. ex. 6 | " | 100 | 0 | " | 0.01 | " | " | " | " |
| Ex. 4 | " | 50 | " | 1.0 | 0.02 | " | " | " | " |
| Ex. 5 | 20 | 1 | " | " | 1.0 | " | " | " | " |
| Com. ex. 7 | " | 0.5 | " | " | 2.0 | " | " | " | " |
| Com. ex. 8 | 30 | 0.2 | " | 0.1 | 0.5 | " | " | " | " |
| Ex. 6 | " | 1 | " | 0.5 | " | " | " | " | " |
| Ex. 7 | " | 6 | " | 3.0 | " | " | " | " | " |
| Ex. 8 | " | 10 | " | 5.0 | " | " | " | " | " |
| Com. ex. 9 | " | 20 | " | 10.0 | " | " | " | " | " |

| Example or Comparative example | Results of polymerization | | | | | |
|---|---|---|---|---|---|---|
| | Polymer yield (Kg) | CY | Percentage of soluble polymer formed (wt. %) | MFR | α-olefin in copolymer (wt. %) | | Ethylene in copolymer (wt. %) |
| | | | | | α-olefin | wt. % | |
| Ex. 1 | 5.1 | 1,020 | 2.1 | 8.5 | 1-butene | 7.1 | 1.5 |
| Com. ex. 1 | 5.5 | 1,100 | 7.2 | 8.8 | " | 6.8 | 1.3 |
| Ex. 2 | 5.2 | 1.040 | 4.5 | 7.6 | " | 6.9 | 1.2 |
| Ex. 3 | 5.4 | 1,080 | 2.2 | 8.8 | " | 6.8 | 1.6 |
| Com. ex. 2 | 5.0 | 1,000 | 6.8 | 8.2 | " | 6.6 | 1.2 |
| Com. ex. 3 | 5.2 | 1,040 | 2.0 | 8.3 | " | 7.2 | 1.5 |
| Com. ex. 4 | 5.1 | 1,020 | 6.5 | 8.3 | " | 6.7 | 1.4 |
| Com. ex. 5 | 5.5 | 1,100 | 4.9 | 8.8 | " | 6.8 | 1.3 |
| Com. ex. 6 | 5.3 | 1,060 | 5.1 | 7.5 | " | 7.0 | 1.2 |
| Ex. 4 | 5.1 | 1,020 | 3.5 | 8.6 | " | 6.7 | 1.4 |
| Ex. 5 | 5.2 | 1,040 | 2.5 | 7.2 | " | 7.3 | 1.5 |
| Com. ex. 7 | 5.4 | 1,080 | 4.0 | 7.7 | " | 6.9 | 1.4 |
| Com. ex. 8 | 5.0 | 1,000 | 6.3 | 8.4 | " | 6.6 | 1.2 |
| Ex. 6 | 5.2 | 1,040 | 3.8 | 8.5 | " | 6.9 | 1.4 |
| Ex. 7 | 5.0 | 1,000 | 2.0 | 8.3 | " | 7.0 | 1.5 |
| Ex. 8 | 5.3 | 1,060 | 1.8 | 8.5 | " | 7.2 | 1.4 |

TABLE 1-continued

| | (Conditions of preactivation) | | | | | | |
|---|---|---|---|---|---|---|---|
| Com. ex. 9 | 5.1 | 1,020 | 1.8 | 8.0 | " | 7.2 | 1.5 |

| Example or Comparative example | Physical properties of copolymers formed | | | | | | | | | |
|---|---|---|---|---|---|---|---|---|---|---|
| | Transparency (haze %) | Young's modulus (Kg/mm²) | Heat-seal temperature (°C.) | Melting point (°C.) | Percentage shrinkage (%) | End-opening property (g/10cm²) | Fish eye | Punching impact strength (Kg-cm) | | | |
| | | | | | | | | −5° C. | 0° C. | 5° C. | 10° C. |
| Ex. 1 | 0.8 | 160 | 135 | 149 | 65 | 450 | 13 | 5.8 | 3.7 | 2.1 | 1.0 |
| Com. ex. 1 | 0.8 | 155 | 138 | 151 | 65 | 550 | 10 | 5.3 | 3.5 | 1.8 | 1.0 |
| Ex. 2 | 0.8 | 160 | 137 | 150 | 65 | 500 | 14 | 5.2 | 3.3 | 1.8 | 0.9 |
| Ex. 3 | 1.0 | 170 | 134 | 148 | 65 | 450 | 20 | 5.9 | 3.8 | 2.1 | 1.1 |
| Com. ex. 2 | 0.7 | 155 | 139 | 152 | 60 | 550 | 16 | 4.9 | 3.1 | 2.0 | 0.8 |
| Com. ex. 3 | 1.5 | 170 | 135 | 149 | 65 | 450 | 46 | 5.8 | 3.6 | 2.2 | 1.0 |
| Com. ex. 4 | 0.7 | 155 | 137 | 150 | 65 | 550 | 12 | 5.0 | 3.2 | 1.7 | 0.8 |
| Com. ex. 5 | 0.8 | 155 | 138 | 150 | 65 | 550 | 11 | 4.8 | 3.0 | 1.6 | 0.7 |
| Com. ex. 6 | 0.7 | 155 | 137 | 151 | 65 | 550 | 15 | 4.8 | 2.9 | 1.6 | 0.7 |
| Ex. 4 | 0.8 | 160 | 136 | 150 | 65 | 500 | 16 | 5.1 | 3.2 | 1.9 | 0.9 |
| Ex. 5 | 1.1 | 165 | 134 | 147 | 65 | 450 | 23 | 5.6 | 3.7 | 2.2 | 1.1 |
| Com. ex. 7 | 1.7 | 160 | 136 | 149 | 65 | 500 | 85 | 5.0 | 3.6 | 2.1 | 1.0 |
| Com. ex. 8 | 0.8 | 155 | 139 | 153 | 55 | 550 | 13 | 4.7 | 2.8 | 1.5 | 0.7 |
| Ex. 6 | 0.7 | 165 | 137 | 150 | 60 | 500 | 10 | 5.5 | 3.4 | 2.0 | 1.0 |
| Ex. 7 | 0.8 | 170 | 136 | 149 | 65 | 400 | 12 | 5.9 | 3.7 | 2.1 | 1.0 |
| Ex. 8 | 1.0 | 175 | 135 | 148 | 65 | 400 | 25 | 6.0 | 3.9 | 2.5 | 1.3 |
| Com. ex. 9 | 2.1 | 175 | 135 | 148 | 65 | 400 | >100 | 5.9 | 3.8 | 2.3 | 1.1 |

*Titanium trichloride composition
**Time during once continuous feed

Explanation of the above results:

In the case of Comparative example 1 (where no preactivation was carried out), the percentage of soluble polymer formed was high, and Young's modulus and end-opening property were inferior; hence the objective quality of product could not be achieved.

In the case of Comparative example 2 (where the preactivation temperature was high), the preactivation effectiveness was small, while, in the case of Comparative example 3 (where the preactivation temperature was low), the preactivation effectiveness was exhibited, but the molecular weight of polymer formed at the time of preactivation became too high, resulting in a bad effect upon haze and fish eyes.

On the other hand, in the cases of Examples, 1, 2 and 3 (where the preactivation temperatures fell within the range of the method of the present invention), good results were obtained without the above-mentioned drawbacks.

In the cases of Comparative examples 4 and 5 (where hydrogen was added for the purpose of controlling the molecular weight of polymer at the time of preactivation), no preactivation effectiveness was exhibited.

In the case of Comparative example 6 (where the rate of propylene feed was low), the preactivation effectiveness was small and this case was undesirable, while, in the case of Comparative example 7 (where the rate of propylene feed was too high), the preactivation effectiveness was not only insufficient, but also the physical properties such as haze and fish eyes became inferior.

On the other hand, in the cases of Examples 4 and 5 (where the rate of propylene feed feel within the range of the method of the present invention), good results were obtained without the above-mentioned drawbacks.

In the case of Comparative example 8 (where the amount of propylene feed at the time of preactivation was small), the preactivation effectiveness was small, while, in the case of Comparative example 9 (where the above-mentioned amount was too large), physical properties such as haze, fish eyes became inferior.

On the other hand, in the cases of Examples 6–8 (where the amounts of propylene fed fell within the range of the method of the present invention), good results were obtained.

GROUP (2)

In this Group, effects of the presence or absence, the kind and the amount of electron donor are shown.

COMPARATIVE EXAMPLE 10

Example 1 was repeated except that no diethylene glycol dimethyl ether was added in the preparation of the catalyst solution. (This Comparative example corresponds to Comparative example 2 in the parent application Ser. No. 786,306.)

EXAMPLES 9–17

Example 1 was repeated except that various electron donors shown in Table 2 were used in various amounts also shown therein, in the preparation of the catalyst solution. (Examples 11, 13, 14, 15, 16 and 17 correspond to Examples 12, 13, 14, 15, 16 and 17 in the patent application, respectively.)

COMPARATIVE EXAMPLE 11

Example 1 was repeated except that no diethylene glycol dimethyl ether was added in the preparation of the catalyst solution and no preactivation was carried out. (This Comparative example corresponds to Comparative example 4 in the parent application.)

Results of the above Examples and Comparative examples are shown in Table 2 together with those of Example 1.

TABLE 2

| | (Electron donors) | |
|---|---|---|
| | | Results of polymerization |
| Eaxmple or | | Percentage of soluble |

TABLE 2-continued

| | (Electron donors) | | | | | | | |
|---|---|---|---|---|---|---|---|---|
| Comparative example | Electron donor Kind | Amount | Polymer yield (Kg) | CY | polymer formed (wt. %) | MFR | α-olefin in copolymer α-olefin / wt. % | Ethylene in copolymer |
| Ex. 1 | diglyme (1*) | 0.05 ml | 5.1 | 1,020 | 2.1 | 8.5 | 1-butene / 7.1 | 1.5 |
| Com. ex. 10 | — | 0 | 5.4 | 1,080 | 5.6 | 8.4 | " / 7.4 | 1.3 |
| Ex. 9 | diglyme | 0.01 ml | 5.7 | 1,140 | 2.4 | 9.0 | " / 7.1 | 1.5 |
| Ex. 10 | " | 0.1 ml | 4.1 | 820 | 1.6 | 7.2 | " / 7.2 | 1.6 |
| Ex. 11 | tetraglyme (2*) | 0.025 ml | 5.2 | 1,040 | 2.1 | 7.9 | " / 7.1 | 1.5 |
| Ex. 12 | " | 0.1 ml | 4.3 | 860 | 1.9 | 8.5 | " / 7.1 | 1.5 |
| Ex. 13 | MMA (3*) | 0.01 g | 5.4 | 1,080 | 3.1 | 8.3 | " / 6.8 | 1.4 |
| Ex. 14 | trimethylphosphite | 0.01 g | 4.8 | 960 | 2.9 | 9.2 | " / 7.1 | 1.6 |
| Ex. 15 | n-butylamine | 0.01 ml | 5.0 | 1,000 | 3.5 | 8.5 | " / 6.7 | 1.4 |
| Ex. 16 | pyridine | 0.03 ml | 4.9 | 980 | 3.3 | 8.6 | " / 7.0 | 1.5 |
| Ex. 17 | $CS_2$ | 0.05 ml | 5.3 | 1,060 | 3.8 | 8.7 | " / 6.9 | 1.3 |
| Com. ex. 11 | — | 0 | 5.6 | 1,120 | 9.4 | 8.6 | " / 6.9 | 1.2 |

| Example or Comparative example | Physical properties of copolymers formed | | | | | | | | | | |
|---|---|---|---|---|---|---|---|---|---|---|---|
| | Transparency (haze %) | Young's modulus (Kg/mm²) | Heat-seal temperature (°C) | Melting point (°C) | Percentage shrinkage (%) | End-opening property (g/10cm²) | Fish eye | Punching impact strength (Kg-cm) | | | |
| | | | | | | | | −5° C. | 0° C. | 5° C. | 10° C. |
| Ex. 1 | 0.8 | 160 | 135 | 149 | 65 | 450 | 13 | 5.8 | 3.7 | 2.1 | 1.0 |
| Com. ex. 10 | 0.7 | 160 | 137 | 150 | 65 | 550 | 16 | 5.2 | 3.1 | 2.0 | 1.0 |
| Ex. 9 | 0.8 | 165 | 134 | 147 | 65 | 450 | 14 | 5.5 | 3.4 | 2.1 | 1.0 |
| Ex. 10 | 0.7 | 170 | 133 | 145 | 70 | 400 | 11 | 5.9 | 3.9 | 2.6 | 1.3 |
| Ex. 11 | 0.7 | 165 | 135 | 149 | 70 | 450 | 16 | 5.3 | 3.1 | 1.9 | 0.9 |
| Ex. 12 | 0.7 | 170 | 135 | 147 | 65 | 400 | 18 | 5.1 | 3.0 | 1.8 | 0.9 |
| Ex. 13 | 0.8 | 165 | 134 | 147 | 70 | 500 | 13 | 5.0 | 2.9 | 1.7 | 0.8 |
| Ex. 14 | 0.6 | 165 | 134 | 147 | 70 | 450 | 12 | 5.7 | 3.3 | 2.2 | 1.0 |
| Ex. 15 | 0.9 | 165 | 136 | 149 | 65 | 500 | 16 | 5.3 | 3.2 | 1.9 | 0.9 |
| Ex. 16 | 0.7 | 165 | 135 | 148 | 70 | 500 | 14 | 5.5 | 3.3 | 2.0 | 0.9 |
| Ex. 17 | 0.9 | 170 | 137 | 150 | 65 | 500 | 11 | 5.1 | 3.2 | 1.7 | 0.8 |
| Com. ex. 11 | 0.8 | 165 | 139 | 151 | 65 | 600 | 14 | 4.5 | 2.8 | 1.2 | 0.6 |

(1*) diethylene glycol dimethyl ether
(2*) tetraethylene glycol dimethyl ether
(3*) methyl methacrylate Explanation of the above results:

In the case of Comparative example 10 (where no electron donor was added), the percentage of soluble polymer formed was high and the physical properties such as end-opening property and Young's modulus was inferior.

In the cases of Examples 9-17 (where diethylene glycol dimethyl ether (0.01 ml, 0.1 ml), tetraethylene dimethyl ether (0.025 ml, 0.1 ml), methyl methacrylate (0.01 g), trimethylphosphite (0.01 g), n-butylamine (0.01 ml), pyridine (0.03 ml) and carbon disulfide (0.05 ml) were used as electron donor, respectively), good results were obtained.

In the case of Comparative example 11 (where neither electron donor nor preactivation were employed), the percentage of soluble polymer formed was high and reduction in the endopening property was large.

GROUP (3)

In this Group, effects in the case where conventional Ziegler-Natta catalysts were used as catalyst in the method of the present invention, are shown.

COMPARATIVE EXAMPLE 12

Example 1 was repeated except that, in the preparation of the catalyst solution, titanium trichloride (AA type) was substituted for the titanium trichloride composition; no diethylene glycol dimethyl ether was added; and no preactivation was applied to the resulting catalyst solution.

COMPARATIVE EXAMPLE 13

Example 1 was repeated except that, in the preparation of the catalyst solution, titanium trichloride (AA type) was substituted for the titanium trichloride composition. (This Comparative example corresponds to Comparative example 1 in the parent application.)

Results of these Comparative examples are shown in Table 3 together with those of Example 1.

TABLE 3

| | (Catalyst components and preactivation | | | | | | | | |
|---|---|---|---|---|---|---|---|---|---|
| Example or comparative example | (Others) Constitution of catalyst | Conditions pf preactivation | | | | | Conditions of polymerization | | |
| | | Temperature (°C.) | Time (Hr) | $H_2$ (l) | Amount of $C_3^=$ fed (g/g . Ti-comp.) | Feed rate of $C_3^=$ (g/Hr, g. Ti-comp.) | Ratio of α-olefin /$C_3^=$ (wt) | $C_2^=$ feed, Amount of $C_2^=$ fed (g) | $C_2^=$ feed, interval (min.)/ feed time (min.) | Feed rate of $C_2^=$ (g/min., Ti-comp.) |
| Ex. 1 | | 30 | 2 | 0 | 1.2 | 0.6 | 1/9 | 96 | 30/5 | 0.64 |
| Com. ex. 12 | Conventional Ziegler Natta catalyst obtained by combining titanium | — | — | — | — | — | " | " | " | " |

TABLE 3-continued

(Catalyst components and preactivation)

| | | | | | | | | | | |
|---|---|---|---|---|---|---|---|---|---|---|
| Com. ex. 13 | trichloride (AA) with organoaluminum Catalyst obtained by adding electron donor to the catalyst of Comparative example 12 followed by preactivation | 30 | 2 | 0 | 1.2 | 0.6 | " | " | " | " |

Results of polymerization

| Example or comparative example | Polymer yield (Kg) | CY | Percentage of soluble polymer formed (wt. %) | MFR | α-olefin in copolymer (wt. %) α-olefin | wt. % | Ethylene in copolymer (wt. %) |
|---|---|---|---|---|---|---|---|
| Ex. 1 | 5.1 | 1,020 | 2.1 | 8.5 | 1-butene | 7.1 | 1.5 |
| Com. ex. 12 | 4.5 | 900 | 18.6 | 9.7 | " | 6.8 | 1.2 |
| Com. ex. 13 | 4.2 | 840 | 15.2 | 9.5 | " | 7.2 | 1.5 |

Physical properties of copolymers formed

| Example or Comparative example | Transparency (haze %) | Young's modulus (Kg/mm$^2$) | Heat-seal temperature (°C.) | Melting point (°C.) | Percentage shrinkage (%) | End-opening property (g/10cm$^2$) | Fish eye | Punching impact strength (Kg-cm) −5° C. | 0° C. | 5° C. | 10° C. |
|---|---|---|---|---|---|---|---|---|---|---|---|
| Ex. 1 | 0.8 | 160 | 135 | 149 | 65 | 450 | 13 | 5.8 | 3.7 | 2.1 | 1.0 |
| Com. ex. 12 | 0.8 | 155 | 138 | 151 | 60 | 700 | 19 | 4.7 | 2.8 | 1.3 | 0.6 |
| Ex. 13 | 0.8 | 155 | 135 | 148 | 65 | 650 | 18 | 5.1 | 3.0 | 1.8 | 0.8 |

Explanation of the above results:

The catalyst of Comparative example 12 is a most standard, conventional Ziegler-Natta catalyst.

Further the catalyst of Comparative example 13 is that obtained by adding an electron donor to the above conventional Ziegler-Natta catalyst followed by preactivation, as in the method of the present invention.

However, in either case of these catalysts, the percentage of soluble polymer formed was much higher than that in the present invention, and the physical properties such as Young's modulus and end-opening property were far inferior to those in the present invention. Thus, it can be seen that, in order to obtain the effectiveness of the present invention, it is necessary that a catalyst obtained by treating the titanium trichloride (AA type) with a reaction product of TiCl$_4$ with an ether be employed; an electron donor be added to the catalyst; and the resulting material be preactivated. These Comparative examples show that even if the catalyst disclosed in U.S. Pat. No. 3,959,409 is substituted for the catalyst or titanium trichloride composition of the present invention, no effectiveness is exhibited.

GROUP (4)

In this Group, effects in the cases where, in the preparation of the reaction product of TiCl$_4$ with an ether, employed for preparing the titanium trichloride composition, the kind of ether and the ratio of the amounts of the reactants were varied, and also where the ratio of the amount of the reaction product to that of titanium trichloride (AA type) was varied in the preparation of the composition, are shown.

EXAMPLES 18–21

Example 1 was repeated except that, in Example 1, (a), (1), amounts of ether and TiCl$_4$ shown in Table 4 were substituted for 5.0 g of diethyl ether and 1.0 g of TiCl$_4$. (These Examples 18–21 correspond to Examples 8, 9, 10 and 11 in the parent application, respectively.)

Results of these Examples are shown in Table 4.

TABLE 4

(Reaction products of TiCl$_4$ with ether)

| Example | Reaction products of TiCl$_4$ with ether ether/amount (g) | Amount of TiCl$_4$ (g) | Polymer yield (kg) | CY | Percentage of soluble polymer formed (wt. %) | MFR | α-olefin in copolymer α-olefin | wt. % | Ethylene in copolymer |
|---|---|---|---|---|---|---|---|---|---|
| Ex. 18 | diethyl ether/10 g | 2.0 | 6.1 | 1,220 | 1.8 | 9.0 | 1-butene | 7.0 | 1.4 |
| ex. 19 | di-n-butyl ether/12 g | 1.2 | 6.4 | 1,280 | 2.5 | 7.6 | " | 6.8 | 1.4 |
| Ex. 20 | di-i-propyl ether/4 g | 0.6 | 4.7 | 940 | 2.0 | 8.9 | " | 7.2 | 1.6 |
| Ex. 21 | di-i-amyl ether/14 | 1.3 | 5.9 | 1,180 | 2.3 | 8.8 | " | 7.0 | 1.5 |

Physical properties of copolymer formed

| Example | Transparency (haze %) | Young's modulus (Kg/mm$^2$) | Heat-seal temperature (°C.) | Melting point (°C.) | Percentage shrinkage (%) | End-opening property (g/10cm$^2$) | Fish eye | Punching impact strength (Kg-cm) −5° C. | 0° C. | 5° C. | 10° C. |
|---|---|---|---|---|---|---|---|---|---|---|---|

TABLE 4-continued

| | (Reaction products of TiCl₄ with ether) | | | | | | | | | |
|---|---|---|---|---|---|---|---|---|---|---|
| Ex. 18 | 0.8 | 165 | 135 | 148 | 65 | 450 | 12 | 5.2 | 3.1 | 2.2 | 1.0 |
| Ex. 19 | 0.7 | 165 | 136 | 149 | 65 | 450 | 14 | 5.0 | 2.9 | 3.8 | 2.0 |
| Ex. 20 | 0.7 | 165 | 133 | 146 | 70 | 450 | 11 | 6.1 | 3.8 | 2.7 | 1.2 |
| Ex. 21 | 0.8 | 165 | 135 | 148 | 65 | 450 | 10 | 5.7 | 3.3 | 2.2 | 1.1 |

GROUP (5)

In this Group, effects of the conditions of ethylene feed upon polymerization are shown.

COMPARATIVE EXAMPLE 14

Example 1 was repeated except that ethylene was fed into the liquid phase part of the polymerization vessel. (This Comparative example corresponds to Comparative example 5 in the parent application.)

COMPARATIVE EXAMPLE 15

Example 1 was repeated except that ethylene was fed into the liquid phase part of the polymerization vessel, not intermittently but continuously, and uniformly for 180 minutes, without varying the total amount of ethylene fed.

COMPARATIVE EXAMPLE 16

Example 1 was repeated except that the total amount 180 g of ethylene (about twice the amount of Example 1) was fed continuously and uniformly for 180 minutes. (This Comparative example corresponds to Comparative example 6 in the parent application.)

EXAMPLES 22-24 AND COMPARATIVE EXAMPLES 17-21

Example 1 was repeated except that the total amount 180 g of ethylene was fed at intervals and times of once continuous feed shown in Table 5, and hence by varying the feed rate, too. However, in the case of Comparative example 21, alone, ethylene was fed into the liquid phase part. (Example 23 and Comparative example 18 correspond to Example 2 and Comparative example 7 in the parent application, respectively.)

COMPARATIVE EXAMPLE 22

Example 1 was repeated except that ethylene was fed so as to give a total amount of 290 g; hence the feed rate, too, was varied.

Results of these Examples are shown in Table 5.

TABLE 5

| | (Conditions of ethylene feed) | | | | | | | | |
|---|---|---|---|---|---|---|---|---|---|
| Example or Comparative example | | Conditions of preactivation | | | | | Conditions of polymerization | | |
| | | Temperature (°C.) | Time (Hr) | $H_2$ (l) | Amount of $C_3=$ fed (g/g . Ti-comp.) | Feed rate of $C_3=$ (g/Hr, g . Ti-comp.) | Ratio of α-olefin/ $C_3=$ (wt) | Amount of $C_2=$ fed (g) | $C_2=$ feed, interval (min.)/ feed time (min.) | Feed rate of $C_2=$ (g/min., Ti-comp.) |
| Ex. 1 | | 30 | 2 | 0 | 1.2 | 0.6 | 1/9 | 96 | 30/5 | 0.64 |
| Com. ex. 14 | into liquid phase | " | " | " | " | " | " | " | " | " |
| Com. ex. 15 | continuous | " | " | " | " | " | " | " | (continuous) | 0.11 |
| Com. ex. 16 | liquid phase continuous | " | " | " | " | " | " | 180 | (continuous) | 0.20 |
| Com. ex. 17 | feed rate | " | " | " | " | " | " | " | 5/2 | 0.5 |
| Ex. 22 | " | " | " | " | " | " | " | " | 5/1.5 | 0.67 |
| Ex. 23 | " | " | " | " | " | " | " | " | 30/5 | 1.2 |
| Ex. 24 | " | " | " | " | " | " | " | " | 60/5 | 2.4 |
| Co. ex. 18 | " | " | " | " | " | " | " | " | 90/5 | 3.6 |
| Co. ex. 19 | " | " | " | " | " | " | " | " | 30/12 | 0.5 |
| Co. ex. 20 | " | " | " | " | " | " | " | " | 30/1 | 6.0 |
| Co. ex. 21 | liquid phase | " | " | " | " | " | " | " | 30/5 | 1.2 |
| Co. ex. 22 | amount of ethylene | " | " | " | " | " | " | 290 | " | 1.9 |

| | Results of polymerization | | | | | |
|---|---|---|---|---|---|---|
| Example or Comparative example | Polymer yield (Kg) | CY | Percentage of soluble polymer formed (wt. %) | MFR | α-olefin in copolymer (wt. %) | | Ethylene in copolymer (wt. %) |
| | | | | | α-olefin | wt. % | |
| Ex. 1 | 5.1 | 1,020 | 2.1 | 8.5 | 1-butene | 7.1 | 1.5 |
| Com. ex. 14 | 5.2 | 1,040 | 2.6 | 8.3 | " | 7.0 | 1.7 |
| Com. ex. 15 | 5.1 | 1,020 | 2.1 | 7.7 | " | 6.9 | 1.6 |
| Com. ex. 16 | 5.6 | 1,120 | 3.5 | 9.1 | " | 7.3 | 2.4 |
| Com. ex. 17 | 5.3 | 1,060 | 3.2 | 8.6 | " | 6.8 | 2.5 |
| Ex. 22 | 5.4 | 1,080 | 3.1 | 9.3 | " | 7.0 | 2.5 |
| Ex. 23 | 5.5 | 1,100 | 3.7 | 7.8 | " | 6.9 | 2.6 |
| Ex. 24 | 5.5 | 1,100 | 3.8 | 8.2 | " | 7.1 | 2.5 |
| Com. ex. 18 | 5.4 | 1,080 | 4.2 | 8.8 | " | 7.1 | 2.6 |
| Com. ex. 19 | 5.5 | 1,100 | 3.5 | 8.1 | " | 7.0 | 2.5 |
| Com. ex. 20 | 5.3 | 1,060 | 4.8 | 9.2 | " | 6.9 | 2.4 |
| Com. ex. 21 | 5.4 | 1,080 | 3.9 | 7.6 | " | 7.1 | 2.4 |
| Com. ex. 22 | 5.1 | 1,020 | 8.8 | 7.7 | " | 7.1 | 3.5 |

TABLE 5-continued

| | (Conditions of ethylene feed) | | | | | | | | | | |
|---|---|---|---|---|---|---|---|---|---|---|---|
| Example or Comparative example | Physical properties of copolymers formed | | | | | | | | | | |
| | Transparency (haze %) | Young's modulus (Kg/mm²) | Heat-seal temperature (°C.) | Melting point (°C.) | Percentage shrinkage (%) | End-opening property (g/10cm²) | Fish eye | Punching impact strength (Kg-cm) | | | |
| | | | | | | | | −5° C. | 0° C. | 5° C. | 10° C. |
| Ex. 1 | 0.8 | 160 | 135 | 149 | 65 | 450 | 13 | 5.8 | 3.7 | 2.1 | 1.0 |
| Co. ex. 14 | 1.4 | 165 | 137 | 151 | 60 | 450 | 55 | 5.4 | 3.2 | 1.6 | 0.8 |
| Co. ex. 15 | 1.2 | 165 | 137 | 150 | 60 | 450 | 35 | 3.6 | 1.5 | 0.7 | 0.2 |
| Co. ex. 16 | 0.7 | 160 | 132 | 144 | 70 | 500 | 12 | 6.5 | 3.4 | 1.4 | 0.5 |
| Co. ex. 17 | 0.7 | 160 | 133 | 145 | 70 | 450 | 14 | 7.3 | 3.9 | 2.8 | 1.4 |
| Ex. 22 | 0.8 | 165 | 132 | 144 | 70 | 450 | 13 | 9.8 | 5.1 | 4.2 | 2.0 |
| Ex. 23 | 0.8 | 170 | 132 | 145 | 70 | 500 | 16 | 10.6 | 7.2 | 4.5 | 2.4 |
| Ex. 24 | 1.1 | 170 | 132 | 145 | 70 | 500 | 20 | 11.5 | 8.1 | 4.7 | 2.6 |
| Co. ex. 18 | 1.6 | 165 | 133 | 146 | 65 | 550 | 57 | 11.6 | 8.0 | 4.5 | 2.5 |
| Co. ex. 19 | 0.8 | 160 | 133 | 145 | 70 | 500 | 15 | 7.3 | 3.8 | 2.0 | 1.2 |
| Co. ex. 20 | 2.1 | 155 | 134 | 146 | 70 | 550 | >100 | 10.4 | 7.6 | 4.6 | 2.5 |
| Co. ex. 21 | 2.5 | 160 | 133 | 146 | 70 | 500 | 76 | 10.6 | 8.1 | 4.5 | 2.6 |
| Co. ex. 22 | 0.9 | 140 | 130 | 139 | 75 | 650 | 21 | 13.1 | 8.9 | 5.0 | 2.8 |

Explanation of the above results:

In the cases of Comparative examples 14, 15 and 21 (where ethylene was fed into the liquid phase part), haze and fish eyes were inferior to those in the case of the feed into the gas phase part.

In the cases of Comparative examples 15 and 16 (where ethylene was fed continuously), the punching impact strength of film was inferior to that in the case of intermittent feed.

Comparative examples 17–20 and Examples 22–24 show that, if the feed rate and interval and once feed time of ethylene were outside the ranges in the method of the present invention, various effectiveness was inferior. Particularly, if the rate of ethylene feed was low, the value of punching impact strength was low, while if it was too high, haze and fish eyes were inferior.

Comparative example 22 shows that if the amount of ethylene fed was too large, Young's modulus and the end-opening property were inferior.

GROUP (6)

In this Group, polymerization results and physical properties in case where the kind of α-olefin fed was varied, are shown.

EXAMPLES 25–28

Example 1 was repeated except that α-olefins shown in Table 6 were employed. (These Examples 25, 26 and 27 correspond to Examples 5, 6 and 7 in the parent application, respectively.)

The results are shown in Table 6.

TABLE 6

| | (Kind of α-olefin) | | | | | | |
|---|---|---|---|---|---|---|---|
| | Results of polymerization | | | | | | |
| Example | Polymer yield (Kg) | CY | Percentage of soluble polymer formed (wt. %) | MFR | α-olefin in copolymer | | Ethylene in copolymer (wt. %) |
| | | | | | α-olefin | wt. % | |
| Ex. 25 | 5.0 | 1,000 | 2.5 | 9.5 | 1-pentene | 4.3 | 1.5 |
| Ex. 26 | 4.8 | 960 | 3.1 | 10.1 | 1-hexane | 3.8 | 1.6 |
| Ex. 27 | 4.5 | 900 | 2.8 | 9.7 | 1-octene | 2.9 | 1.5 |
| Ex. 28 | 4.6 | 920 | 2.9 | 8.6 | 1-dodecene | 2.2 | 1.4 |
| | Physical properties of copolymers formed | | | | | | |
| Example | Transparency (haze %) | Young's modulus (Kg/mm²) | Heat-seal temperature (°C.) | Melting point (°C.) | Percentage shrinkage (%) | End-opening property (g/10 cm²) | Fish eye | Punching impact strength (Kg-cm) |
| | | | | | | | | −5° C. | 0° C. | 5° C. | 10° C. |
| Ex. 25 | 0.7 | 165 | 137 | 152 | 60 | 450 | 14 | 4.8 | 4.6 | 4.5 | 4.2 |
| Ex. 26 | 0.8 | 170 | 135 | 150 | 65 | 450 | 10 | 3.2 | 3.1 | 3.4 | 3.0 |
| Ex. 27 | 0.9 | 165 | 136 | 152 | 60 | 450 | 12 | 1.7 | 1.8 | 1.9 | 1.6 |
| Ex. 28 | 0.8 | 170 | 138 | 154 | 60 | 450 | 11 | 0.8 | 0.7 | 0.8 | 0.6 |

GROUP (7)

This Group shows that even if polymers consisting of two kinds of monomers were obtained according to a method similar to that of the present invention or a method where the polymerization conditions were varied from those of the present invention, the same effectiveness as that of the present invention could not be obtained.

COMPARATIVE EXAMPLES 23–26

Propylene-ethylene copolymer was obtained as in Example 1 except that, in the polymerization reaction, propylene alone was employed in place of the mixed gas of propylene with butene-1, and the conditions of ethylene feed were varied as shown in Table 7, (Comparative examples 23, 24, 25 and 26 correspond to Comparative examples 8, 9, 10 and 11 in the parent application, respectively.)

COMPARATIVE EXAMPLE 27 AND 28

Propylene-butene copolymer was obtained in Example 1 except that, in the polymerization reaction, the composition of the mixed gas of propylene with 1- butene was varied as shown in Table 7 and no ethylene was fed.

Results of these Comparative examples are shown in Table 7 together with those of Example 1.

if an electron donor was added to the catalyst of the prior art method, followed by preactivation, as in the present invention; and that the terpolymer of the present invention could not be obtained even if the catalyst

TABLE 7

| | Product of copolymer | | | | | | | | |
|---|---|---|---|---|---|---|---|---|---|
| | | | | | | Conditions of polymerization | | | |
| Example or Comparative example | Conditions of preactivation | | | | | | $C_2=$ feed, | | |
| | Temperature (°C.) | Time (Hr) | $H_2$ (l) | Amount of $C_3=$ fed (g/g . Ti-comp.) | Feed rate of $C_3=$ (g/Hr, g. Ti-comp.) | Ratio of α-olefin /$C_3=$ (wt) | Amount of $C_2=$ fed (g) | interval (min.)/ feed time (min.) | Feed rate of $C_2=$ (g/min., Ti-comp.) |
| Ex. 1 | 30 | 2 | 0 | 1.2 | 0.6 | 1/9 | 96 | 30/5 | 0.64 |
| Com. ex. 23 | " | " | " | " | " | 0 | 180 | " | 1.2 |
| Com. ex. 24 | " | " | " | " | " | 0 | " | (continuous) | 0.2 |
| Com. ex. 25 | " | " | " | " | " | 0 | 400 | 30/5 | 2.7 |
| Com. ex. 26 | " | " | " | " | " | 0 | " | (continuous) | 0.4 |
| Com. ex. 27 | " | " | " | " | " | 1/9 | 0 | — | — |
| Com. ex. 28 | " | " | " | " | " | 1/5 | 0 | — | — |

| | Results of polymerization | | | | | |
|---|---|---|---|---|---|---|
| Example or Comparative example | Polymer yield (kg) | CY | Percentage of soluble polymer formed (wt. %) | MFR | α-olefin in copolymer (wt. %) | | Ethylene in copolymer (wt. %) |
| | | | | | α-olefin | wt. % | |
| Ex. 1 | 5.1 | 1,020 | 2.1 | 8.5 | 1-butene | 7.1 | 1.5 |
| Com. ex. 23 | 4.7 | 940 | 5.3 | 7.8 | — | 0 | 2.5 |
| Com. ex. 24 | 5.1 | 1,020 | 4.8 | 8.2 | — | 0 | 2.6 |
| Com. ex. 25 | 4.8 | 960 | 12.6 | 7.2 | — | 0 | 4.2 |
| Com. ex. 26 | 5.0 | 1,000 | 8.7 | 7.5 | — | 0 | 4.3 |
| Com. ex. 27 | 4.7 | 940 | 2.0 | 9.7 | 1-butene | 7.1 | 0 |
| Com. ex. 28 | 4.9 | 980 | 4.3 | 9.4 | " | 13.4 | 0 |

| Example or Comparative example | Physical properties of copolymers formed | | | | | | | | | | |
|---|---|---|---|---|---|---|---|---|---|---|---|
| | Transparency (haze %) | Young's modulus (Kg/mm²) | Heat-seal temperature (°C.) | Melting point (°C.) | Percentage shrinkage (%) | End-opening property (g/10cm²) | Fish eye | Punching impact strength (Kg-cm) | | | |
| | | | | | | | | −5° C. | 0° C. | 5° C. | 10° C. |
| Ex. 1 | 0.8 | 160 | 135 | 149 | 65 | 450 | 13 | 5.8 | 3.7 | 2.1 | 1.0 |
| Com. ex. 23 | 1.2 | 175 | 144 | 154 | 30 | 450 | 15 | 2.8 | 1.3 | 0.4 | — |
| Com. ex. 24 | 1.0 | 155 | 142 | 151 | 35 | 450 | 11 | 2.2 | 0.8 | 0.2 | — |
| Com. ex. 25 | 2.5 | 140 | 138 | 148 | 50 | 600 | 25 | 4.2 | 1.7 | 0.9 | 0.2 |
| Com. ex. 26 | 1.7 | 120 | 135 | 145 | 55 | 550 | 19 | 3.0 | 1.2 | 0.5 | — |
| Com. ex. 27 | 0.7 | 175 | 148 | 158 | 25 | 450 | 12 | 2.5 | 1.0 | 0.2 | — |
| Com. ex. 28 | 0.8 | 165 | 140 | 152 | 40 | 450 | 17 | 2.7 | 1.3 | 0.4 | — |

Explanation of the above results:

Even if polymerization was carried out with the same catalyst, and even if polymerization was carried out under similar polymerization conditions, polymerization of two-component system (ethylene-propylene) (Comparative examples 23-26) was undesirable as compared with polymerization of three-component system of the present invention, that is, the percentage of soluble polymer formed was high and physical properties of the resulting polymer such as haze, Young's modulus and punching impact strength were inferior.

Further, in the cases of polymerization of two-component system (propylene-α-olefin) (Comparative examples 27 and 28), physical properties of the resulting polymer such as heat-seal temperature and punching impact strength were also inferior.

GROUP (8)

This Group shows that the terpolymers of the present invention could not be obtained according to the prior art method of U.S. Pat. No. 3,959,409; that the terpolymer of the present invention could not be obtained even of the present invention was applied to the prior art method.

COMPARATIVE EXAMPLE 29

Employing a 50 l capacity polymerization vessel, propylene (3.6 kg) was polymerized in a butene-butane mixed liquid (8.0 kg) (trans-butene-2, 38%; cis-butene-2, 31%; butane, 30.5%, and butene-1, 0.5%) containing a catalyst consisting of titanium trichloride (AA) (6 g) and diethylaluminum chloride (8 g) and hydrogen (0.04 g), at 50° C. for 5 hours. During the polymerization time, ethylene (72 g) was uniformly fed therein (14.4 g/Hr). After 5 hours, 40 g of water was added to terminate the polymerization, followed by purging the gas inside the reactor to obtain a terpolymer of propylene-ethylene-butene-1. The results are shown in Table 8. The percentage of soluble polymer formed was high, and the physical properties, particularly Young's modulus, end-opening property, heat-seal temperature, impact strength, etc. were inferior; thus the effectiveness of the present invention could not be obtained. (This Comparative example corresponds to Example 6 of the above-mentioned U.S. patent).

COMPARATIVE EXAMPLE 30

Polymerization was carried out as in Comparative example 29 except that, to titanium trichloride (6 g) and diethylaluminum chloride (8 g) employed in Comparative example 29, were further added diethylene glycol dimethyl ether (0.06 ml) and propylene for preactivation (3.6 g/Hr), followed by the same procedure as in Example 1 to obtain a preactivated catalyst solution, which was employed as catalyst in this Comparative example. The resulting percentage of soluble polymer formed, impact strength, end-opening property and heat-seal temperature were far inferior to those of the present invention.

COMPARATIVE EXAMPLE 31

(a) Preparation of titanium trichloride:

Into a 5 l capacity, stainless steel reactor equipped with a stirrer were fed n-hexane (2.1 l) and ethylaliuminum sesquichloride (346.5 g, 1.4 mol) (20% n-hexane solution). While the contents were cooled to $-5°$ C., $TiCl_4$ (one mol, 190 g) was dropwise added thereto with stirring for 8 hours. The temperature was then elevated from $-5°$ C. up to 10° C. and stirring was continued for 12 hours, followed by elevating the temperature up to 130° C. and stirring for 6 hours. Thereafter the supernatant was removed by decantation, followed by twice washings with n-butane to obtain dry titanium trichloride ($TiCl_3.0.5AlCl_3$) (210 g).

(b) Polymerization reaction:

Employing a 50 l capacity polymerization vessel, propylene (3.0 kg) was polymerized in a butene-butane mixed liquid (12 kg) (butene-2, 60%; butane, 39.5%; butene-1, 0.5%) containing a catalyst consisting of titanium trichloride obtained above in a) and hydrogen (0.06 g), at 50° C. for 6 hours. During the polymerization, ethylene was fed to the liquid phase 5 times in total, once per hour of the polymerization time, each time in an amount of 18 g for 3 minutes. The amount of ethylene fed was 90 g in total. After the polymerization reaction for 6 hours, 200 g of methanol was fed to terminate the polymerization reaction, followed by recovery of polymer. The results are shown in Table 8. The percentage of soluble polymer formed was high, and physical properties such as haze, end-opening property, Young's modulus and fish eyes were inferior; thus the effectiveness of the present invention could not be obtained. (This Comparative example corresponds to Example 14 of the above-mentioned U.S. patent).

COMPARATIVE EXAMPLE 32

To the catalyst components employed in Comparative example 31 (4.6 g of titanium trichloride and 6.6 g of diethylaluminum chloride), were added diethylene glycol dimethyl ether (0.046 ml) and propylene for preactivation (2.8 g/Hr), followed by the same procedure as in Example 1 to obtain a preactivated catalyst solution. Polymerization was carried out as in Comparative example 31 except that the preactivated catalyst solution obtained above was employed. The percentage of soluble polymer formed, Young's modulus, haze, end-opening property of film and fish eyes were inferior to those of the present invention.

COMPARATIVE EXAMPLE 33

Polymerization was carried out as in Comparative example 31 except that a preactivated catalyst obtained as in Example 1, (a), (b) was employed, and the ethylene feed time per once (3 minutes) was changed to 12 minutes. The haze and fish eyes of the resulting polymer were inferior. (This Comparative example corresponds to Example 14 of the above-mentioned U.S. patent except that the preactivated catalyst of the present invention was employed as catalyst, and ethylene was fed under the same conditions as in the present invention, except for feed to the liquid phase.)

COMPARATIVE EXAMPLE 34

Polymerization was carried out as in Comparative example 31 except that a preactivated catalyst obtained as in Example 1 was employed as catalyst. The haze and fish eyes of the resulting polymer were inferior.

Results of these Comparative examples are shown in Table 8.

TABLE 8

| Comparative Example | Conditions of preactivation | | | | | Conditions of polymerization | | | |
|---|---|---|---|---|---|---|---|---|---|
| | Temperature (°C.) | Time (Hr) | $H_2$ (l) | Amount of $C_3^=$ fed (g/g · Ti-comp.) | Feed rate of $C_3^=$ (g/Hr, g · Ti-comp.) | Ratio of α-olefin/ $C_3^=$ (wt) | Amount of $C_2^=$ fed (g) | $C_2^=$ feed, interval (min.)/ feed time (min.) | Feed rate of $C_2^=$ (g/min., Ti-comp.) |
| Com. ex. 29 | — | — | — | — | — | 5.6/3.6 | 72 | (continuous) | 0.24 |
| Com. ex. 30 | 30 | 2 | 0 | 1.2 | 0.6 | " | " | " | " |
| Com. ex. 31 | — | — | — | — | — | 7.3/3.0 | 90 | 60/3 | 6.0 |
| Com. ex. 32 | 30 | 2 | 0 | 1.2 | 0.6 | " | " | " | " |
| Com. ex. 33 | " | " | " | " | " | " | " | 6/12 | 1.5 |
| Com. ex. 34 | " | " | " | " | " | " | " | 6/3 | 6.0 |

| Comparative example | Results of polymerization | | | | | | |
|---|---|---|---|---|---|---|---|
| | Polymer yield (Kg) | CY | Percentage of soluble polymer formed (wt. %) | MFR | α-olefin copolymer (wt. %) | | Ethylene in copolymer (wt. %) |
| | | | | | α-olefin | wt. % | |
| Com. ex. 29 | 2.6 | 433 | 13.5 | 8.5 | 1-butene | 0.8 | 2.4 |
| Com. ex. 30 | 2.4 | 400 | 9.6 | 8.1 | " | 1.1 | 2.6 |
| Com. ex. 31 | 2.2 | 478 | 10.8 | 8.4 | " | 2.5 | 3.1 |

TABLE 8-continued

| | | | | | | | | | | |
|---|---|---|---|---|---|---|---|---|---|---|
| Com. ex. 32 | | 2.0 | 435 | 8.5 | 8.7 | " | | 2.8 | 3.4 | |
| Com. ex. 33 | | 2.4 | 480 | 2.6 | 8.6 | " | | 2.6 | 3.1 | |
| Com. ex. 34 | | 2.4 | 480 | 3.0 | 8.5 | " | | 2.7 | 3.2 | |

| | Physical properties of copolymers formed | | | | | | | | | |
|---|---|---|---|---|---|---|---|---|---|---|
| Comparative example | Transparency (haze %) | Young's modulus (Kg/mm$^2$) | Heat-seal temperature (°C.) | Melting point (°C.) | Percentage shrinkage (%) | End-opening property (g/10cm$^2$) | Fish eye | Punching impact strength (Kg-cm) | | |
| | | | | | | | | −5° C. | 0° C. | 5° C. | 10° C. |
| Com. ex. 29 | 0.8 | 155 | 142 | 155 | 45 | 550 | 10 | 2.0 | 1.1 | 0.4 | — |
| Com. ex. 30 | 0.8 | 155 | 141 | 154 | 45 | 500 | 10 | 2.1 | 1.1 | 0.3 | — |
| Com. ex. 31 | 2.4 | 145 | 137 | 149 | 60 | 650 | 57 | 5.1 | 3.3 | 1.5 | 0.7 |
| Com. ex. 32 | 2.7 | 145 | 138 | 148 | 60 | 600 | 62 | 5.5 | 3.6 | 1.8 | 1.2 |
| Com. ex. 33 | 1.5 | 165 | 138 | 149 | 60 | 450 | >100 | 5.2 | 3.2 | 1.5 | 0.8 |
| Com. ex. 34 | 3.2 | 165 | 139 | 150 | 60 | 450 | >100 | 5.4 | 3.5 | 1.6 | 1.0 |

What is claimed is:

1. A method for producing a crystalline copolymer consisting of 0.5–3% by weight of ethylene, 85–97% by weight of propylene and 2–11% by weight of another α-olefin having 4–12 carbon atoms, which comprises:
(a) preparing a catalyst solution by mixing together
   (i) a titanium trichloride composition obtained by mixing and milling
      (1) a titanium trichloride obtained by reducing TiCl$_4$ by metallic aluminum or by further milling the resulting reduction product, together with
      (2) a reaction product of a mixture of titanium tetrachloride with an ether,
   in a mixing ratio of said titanium trichloride (1) to said reaction product (2) of 1:0.001 to 0.3,
   (ii) a dialkylaluminum halide,
   (iii) an electron donor compound, and
   (iv) an inert solvent,
(b) feeding propylene into the resulting catalyst solution at a temperature of 10°–50° C.
   (i) at a feeding rate in a ratio by weight of 0.02–1/said titanium trichloride composition/hr.
   (ii) in a feeding amount in a ratio by weight of 0.5–5/ said titanium trichloride composition, and
   (iii) under a pressure of atmospheric pressure to 10 atmospheres,
to obtain an activated catalyst solution containing polypropylene in an amount of 0.5–5 times the weight of the titanium trichloride composition contained in said catalyst solution, in advance of the subsequent copolymerization, and
(c) feeding into a polymerization zone containing said activated catalyst solution,
   (1) 100 parts by weight of propylene,
   (2) 2 to 13 parts by weight of an α-olefin having 4 to 12 carbon atoms, and
   (3) 1 to 5 parts by weight of ethylene,
   said propylene and said α-olefin having 4–12 carbon atoms being fed into the catalyst solution at the same time and continuously,
   said ethylene being fed into the gas phase part of the polymerization zone intermittently at time intervals of 5 to 60 minutes, the once feeding time being 1 to 5 minutes, and the polymerization condition being under a temperature of 50° to 75° C. and a pressure of 5 to 40 kg/cm$^2$.

2. A method according to claim 1 wherein said dialkylaluminum halide is selected from the group consisting of diethylaluminum chloride, di-n-propylaluminum chloride, di-i-butylaluminum chloride, diethylaluminum bromide, diethylaluminum iodide and diethylaluminum fluoride.

3. A method according to claim 1 wherein said electron donor compound is selected from the group consisting of oxygen-containing organic compounds, nitrogen-containing organic compounds, sulfur-containing organic compounds, and phosphorus-containing organic compounds.

4. A method according to claim 1 wherein said electron donor is selected from the group consisting of aliphatic monoethers having 2–20 carbon atoms, aliphatic glycol ethers having 2–20 carbon atoms, aliphatic or aromatic carboxylic acid esters, aliphatic or alkylaryl, primary, secondary or tertiary amines having 2–20 carbon atoms, aliphatic or alkylaryl thioethers having 2–20 carbon atoms, carbon disulphide, trialkyl or triaryl phosphines having 3–21 carbon atoms and trialkyl phosphites having 3–21 carbon atoms.

* * * * *